United States Patent
Chen et al.

[11] Patent Number: 6,115,126
[45] Date of Patent: Sep. 5, 2000

[54] OPTICAL WAVEFRONT ANALYZER AND METHOD USING A SINGLE WAVE SHIFTER

[75] Inventors: Yi-Chun Chen, Keelung; Shu-Sheng Lee, Taipei; Chung-Min Lee, Taipei; Ching-Wei Chen, Taipei; Heui-Yung Chang, Taipei; Gym-Bin Yeh, Taipei; Chih-Kung Lee, Taipei; Shih-Tsong Lin, Taipei; Chi-Tang Hsieh, Taipei Hsein; Wei-Liang Chen, Taoyuan Hsein, all of Taiwan

[73] Assignee: National Science Council, Taipei, Taiwan

[21] Appl. No.: 09/235,874

[22] Filed: Jan. 22, 1999

[30] Foreign Application Priority Data

Feb. 5, 1998 [TW] Taiwan ................... 87101535

[51] Int. Cl.⁷ ........................................ G01B 9/02
[52] U.S. Cl. ............................................. 356/353
[58] Field of Search ..................................... 356/353

[56] References Cited

U.S. PATENT DOCUMENTS

| | | |
|---|---|---|
| 3,229,177 | 1/1966 | Clarke . |
| 4,643,576 | 2/1987 | Kanoh et al. .................. 356/353 |
| 4,744,659 | 5/1988 | Kitabayashi .................... 356/353 |
| 4,768,881 | 9/1988 | Juptner et al. .................. 356/347 |
| 4,786,175 | 11/1988 | Duffus ........................... 356/353 |
| 5,305,074 | 4/1994 | Feldman ........................ 356/345 |
| 5,357,341 | 10/1994 | Kuchel et al. .................. 356/353 |
| 5,432,447 | 7/1995 | Song ............................. 324/309 |
| 5,771,097 | 6/1998 | Kusunose et al. .............. 356/353 |

FOREIGN PATENT DOCUMENTS

WO 92/20991  11/1992  WIPO ..................... G01B 9/02

OTHER PUBLICATIONS

M.P. Rimmer; "Method for Evaluating Lateral Shearing Interferograms;" Applied Optics; vol. 13, No. 3 (Mar. 1974).

*Primary Examiner*—Robert H. Kim
*Assistant Examiner*—Philip Natividad
*Attorney, Agent, or Firm*—Knobbe, Martens, Olson & Bear, LLP

[57] ABSTRACT

An optical wavefront analyzer based on the phase-shearing interferometry technique for measuring a wavefront of a light beam is disclosed. The analyzer includes a single phase shifter, a driving device, a pattern receiving device, and a phase reconstructing device. A method of measuring a wavefront of a light beam is also provided for solving the problems of two-axial focusing and phase inconsistency encountered the prior art by employing phase-shearing and phase-shifting techniques to improve the method of optical wavefront mesurement. A non-iterative, path-independent unwrapping methodology is used to deal with a complicated wavefront.

24 Claims, 13 Drawing Sheets

OPTICAL WAVEFRONT ANALYZER AND METHOD USING A SINGLE WAVE SHIFTER

FIELD OF THE INVENTION

The present invention relates to an optical wavefront analyzer, and more particularly to an optical wavefront analyzer based on a phase-shearing interferometry technique for measuring a wavefront of a light beam.

BACKGROUND OF THE INVENTION

The optical wavefront measurement has become one of the most important aplications in optical system. Commercially available optical wavefront measurement apparatuses can be divided into two groups. One is a different path interferometer represented by Ladite Machine of American Wyko company; the other is a common path interferometer represented by WaveAlyzer of American Blue Sky Research. The common path interferometry technique has gradually become a mainstream due to its advantage of protecting the system from environmental interference.

Please refer to FIG. 1 which is a schematic diagram showing a phase-shearing interferometry technique. When a light beam I is made incident on a phase shifter 11, two reflected beams R1, R2 generated from the front and back surfaces of the phase shifter 11 and having a path difference attributed to a thickness t of the phase shifter 11 are interfered with each other to produce an interference pattern. Please refer to FIG. 2 which shows a hardware structure of the known WaveAlyzer arranged with two sets of phase shifters 21, 24 and reflective mirrors 22, 25 for directing an incident light beam I into the charge coupled devices (CCD) 23, 26 adapted to be used as cameras so as to receive an interference pattern. One of the phase shifters 21, 24 is disposed ahead of the other by a phase of 90° with respect to the incident directon of the light beam I.

Please refer to FIG. 3 which is a schematic diagram showing a flowchart of an optical wavefront measurement based on a phase-shearing interferometry technique. The phase shifter 21, the reflective mirror 22 and the CCD 23 are used to receive an interference pattern from the first axis (called as X-axis). The phase shifter 21 is finely rotated five times by the ThermX™ electronic driving device 27 for changing the incident angle θ of the incident light beam I with respect to the phase shifter 21 and a five-step phase shifting technique is adopted to obtain a first set of interference patterns. The light intensity function is expressed as:

$$I(x,y)=I_0(x,y)[1+\gamma_0 \cos \phi(x,y)] \quad (1)$$

where $I_0(x,y)$ is the light intensity of the incident light beam I, $\gamma_0$ is the visibility of an interference pattern, and $\phi(x,y)$ is the difference of the phase angle owing to shearing effect. There are three unknow variables ($I_0, \gamma_0, \phi$) in Equation (1). In other words, at least three independent measuring results are needed to determine the difference of the phase angle $\phi(x,y)$. The Five-step technique is commonly used in the operational theory of light intensity phase transform. The phase shifter 21 is finely rotated five times by the ThermX™ electronic driving device 27 for changing the incident angle θ of the incident light beam I with respect to the phase shifter 21, resulting in changes in the intensities of interference lights received by the CCD 23. In a phase reconstruction process, a shearing interference technique is utilized for introducing a known phase shift into an intereference pattern so as to obtain five light intensity equations:

$$I_1(x,y)=I_0(x,y)[1+\gamma_0 \cos(\phi-2\alpha)] \quad (2.1)$$

$$I_2(x,y)=I_0(x,y)[1+\gamma_0 \cos(\phi-\alpha)] \quad (2.2)$$

$$I_3(x,y)=I_0(x,y)[1+\gamma_0 \cos(\phi)] \quad (2.3)$$

$$I_4(x,y)=I_0(x,y)[1+\gamma_0 \cos(\phi+\alpha)] \quad (2.4)$$

$$I_5(x,y)=I_0(x,y)[1+\gamma_0 \cos(\phi+2\alpha)] \quad (2.5)$$

where α represents the relative phase shift obtained by finely rotating the phase shifter 21resulting in a changed difference of the phase angle. From Eqs. (2.1)–(2.5), after a few derivations, we obtain:

$$\cos\alpha = \frac{I_5 - I_1}{2(I_4 - I_2)} \quad (3)$$

$$\frac{\sin\alpha \sin\phi}{(1-\cos 2\alpha)\cos\phi} = \frac{I_2 - I_4}{2I_3 - I_5 - I_1}$$

when $\alpha=\pi/2$, Eq. (3) can be simplfied as:

$$\tan\phi=2(I_2-I_4)/(2I_3-I_5-I_1) \quad (4)$$

By the above-mentioned method, the interference of random noise can be eliminated and the difference of the shearing phase angle $\phi(x,y)$ can be obtained immediately and accurately.

The phase shifter 24, the reflective mirror 25, and the CCD 26 are used to receive an interference pattern from the second axis (called as Y-axis). The phase shifter 24 is also finely rotated five times by the ThermX™ electronic driving device 27 for changing the incident angle θ of the incident light beam I with respect to the phase shifter 24 and a five-step phase shifting technique is adopted to obtain a second set of interference patterns and the difference of the shearing phase angle $\phi(x,y)$.

A phase unwrapping process is then performed for the two sets of interference patterns from the first axis and the second axis, respectively, through a function fitting method with programs installed inside the computer 28 so as to complete an optical wavefront inspection.

The above-mentioned conventional technique has two shortcomings in practical application: one is that it is difficult to place a prior mechanism having two independent systems required for generating and receiving interference patterns into an experimental system for optical wavefront inspection due to the large size of the prior mechanism; another is the phase inconsistency caused by the existence of two phase shifters 21, 24 separated from each other by a certain distance. The phase inconsistency becomes particularly evident as the optical wavefront of a light beam becomes more sophisticated. Any environmental disturbance occurred between two phase shifters 21, 24 will introduce extra errors into the received data and spoil the consistency between data from two axes. Furthermore, since the data from two axes will be sent to the CCD 23, 26 at different positions, those data from two axes have to be adjusted into consistence.

Thus, it is tried by the applicant to deal with the situation encountered by the prior art. An optical wavefront analyzer having fewer components in comparison with the commercially available apparatus is developed. The size of the system according to the present invention is about one-tenth of other system performing similar functions. The small size of this system according to the present invention is advantageously connected to other optical experimental equipment and also greatly widens the application of optical wavefront measurement. In addition, the present invention overcomes the problems of two-axial focusing and phase inconsistency by employing phase-shearing and phase-shifting techniques to improve the method of optical wavefront mesurement.

SUMMARY OF THE INVENTION

An object of the present invention is to provide an optical wavefront analyzer with fewer components and a smaller size in comparison with the commercially available apparatus so as to be more easily connected to other optical experimental equipment and greatly widen the application of optical wavefront measurement.

Another object of the present invention is to solve the problems of two-axial focusing and phase inconsistency encountered by the prior art by employing phase-shearing and phase-shifting techniques to improve the method of optical wavefront mesurement.

Another object of the present invention is to provide a non-iterative, path-independent unwrapping methodology for dealing with complicated wavefront.

According to one aspect of the present invention, the optical wavefront analyzer for measuring a wavefront of a light beam having an incident direction includes (a) a phase shifter for generating interference patterns as the light beam is made incident on the phase shifter at an incident angle, (b) a driving device for positioning the phase shifter to a plurality of positions with respect to which the light beam is made incident on the phase shifter at a plurality of the incident angles respectively in order to obtain a first set of interference patterns, and for rotating the phase shifter with respect to the incident direction from a first position (also called as a first axis, or X-axis) to a second position (also called as a second axis, or Y-axis) so as to respectively obtain the first set of interference patterns and a second set of interference patterns, (c) a pattern receiving device for recording light intensities of the first set of interference patterns and the second set of interference patterns respectively, and (d) a phase reconstructing device electrically connected to the pattern receiving device for executing a phase unwrapping operation according to the light intensities.

In a preferred embodiment, the driving device includes (a) a first rotating mechanism for positioning thereon and rotating the phase shifter to a plurality of positions with respect to which the light beam is made incident on the phase shifter at a plurality of the incident angles respectively in order to obtain a first set of interference patterns, and for aligning the phase shifter with the pattern receiving device so as to allow the interference patterns to enter into the pattern receiving device, and (b) a second rotating mechanism for positioning and rotating the phase shifter and the pattern receiving device with respect to the incident direction from the first position to the second position so as to respectively obtain the first set of interference patterns and the second set of interference patterns.

The second rotating mechanism includes an outer case positioning therein the phase shifter and the pattern receiving device. The outer case includes one selected from a cylinder or two coaxially rotating cubic boxes. The second rotating mechanism further has a step motor for rotating the outer case.

The first rotating mechanism has one selected from a step motor or a ThermX™ electronic driving device for rotating the phase shifter. The phase shifter is a shear plate. The phase reconstruction device is a computer. The light beam is a laser beam.

The pattern recording device further includes (a) a CCD connected to the second rotating mechanism and used as a camera to receive the interference patterns, and (b) a reflective mirror connected to the second rotating mechanism for reflecting the interference patterns. The CCD is mounted on the first rotating mechanism and thereby aligned with the reflective mirror so as to receive the interference patterns therefrom. The reflective mirror can also be mounted on the first rotating mechanism and thereby aligned with the CCD so as to direct the interference patterns to enter into the CCD.

According to another aspect of the present invention, a method of measuring a wavefront of a light beam having an incident direction includes the steps of (a) causing the light beam to be incident with respect to the incident direction at a first incident angle to be reflected with two interfering reflected beams at a first position, (b) respectively causing the light beam to be incident with respect to the incident direction at a first plurality of finely adjusted incident angles to be respectively reflected with a first plurality of pairs of two interfering reflected beams at a first plurality of finely adjusted positions around the first position in order to respectively obtain a first set of interference patterns having respectively a plurality of light intensities, (c) recording and measuring the plurality of light intensities, (d) causing light beam to be incident with respect to the incident direction at a second incident angle to be reflected with two interfering reflected beams at a second position, (e) respectively causing the light beam to be incident with respect to the incident direction at a second plurality of finely adjusted incident angles to be respectively reflected with a second plurality of pairs of two interfering reflected beams at a second plurality of finely adjusted positions around the second position in order to respectively obtain a second set of interference patterns having respectively a plurality of light intensities, and (f) utilizing the light intensities data to determine the wavefront of the light beam.

More preferably, the step of causing the light beam to be incident with respect to the incident direction at a first incident angle to be reflected with two interfering reflected beams at a first position is performed by a phase shifter. The phase shifter is a shear plate.

The method includes a step of directing the reflected beams to a certain direction. The first position and said second position has a 90° angular difference.

The step of utilizing the light intensities data to determine the wavefront of the light beam includes executing a phase unwrapping operation according to the light intensities. The phase unwrapping operation is performed by a non-iterative, path-independent unwrapping methodology. The non-iterative, path-independent unwrapping methodology is a method selected from a group consisting of discrete Fourier transform, fast Fourier transform, and discrete cosine transform.

The present invention may best be understood through the following description with reference to the accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 4:
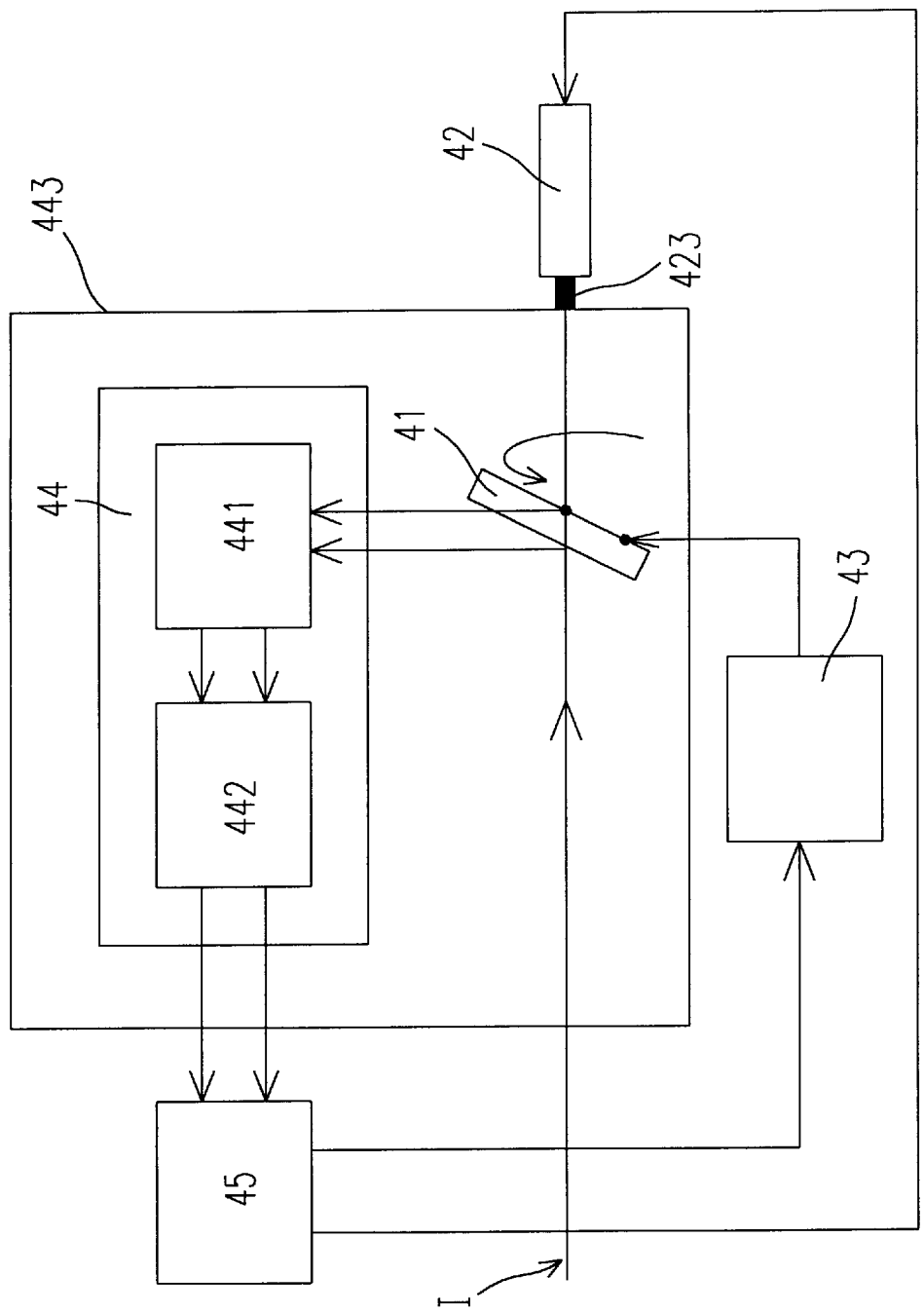
FIG. 4 is a block diagram showing a preferred embodiment of an optical wavefront analyzer according to the present invention.

Please refer to FIG. 4 showing a preferred embodiment of an optical wavefront analyzer according to the present invention. The optical wavefront analyzer includes: (a) a phase shifter 41 for generating interference patterns as the light beam I is made incident on the phase shifter 41 at an incident angle θ (shown in FIG. 1), (b) a driving device further having a first rotating mechanism 43 for positioning thereon and rotating the phase shifter 41 to a plurality of positions with respect to which the light beam I is made incident on the phase shifter 41 at a plurality of the incident angles respectively in order to obtain a first set of interference patterns, and for aligning the phase shifter 41 with the pattern receiving device 44 so as to allow the interference patterns to enter into the pattern receiving device 44, and a second rotating mechanism 42 for positioning therein and rotating the phase shifter 41 and the pattern receiving device 44 with respect to the incident direction from the first position to the second position so as to respectively obtain the first set of interference patterns and the second set of interference patterns, (c) a pattern receiving device 44 for recording light intensities of the first set of interference patterns and the second set of interference patterns respectively, and (d) a phase reconstructing device 45 electrically connected to the pattern receiving device 44 for executing a phase unwrapping operation according to the light intensities.

The second rotating mechanism 42 includes an outer case 443 positioning therein the phase shifter 41 and the pattern receiving device 44. The outer case 443 includes one selected from a cylinder or two coaxially rotating cubic boxes. The second rotating mechanism 42 further has a step motor for rotating the outer case 443 and a rotary axle 423 in which the central axis of the rotary axle 423 is in accordance with the incident direction of the light beam I.

Figure 2:
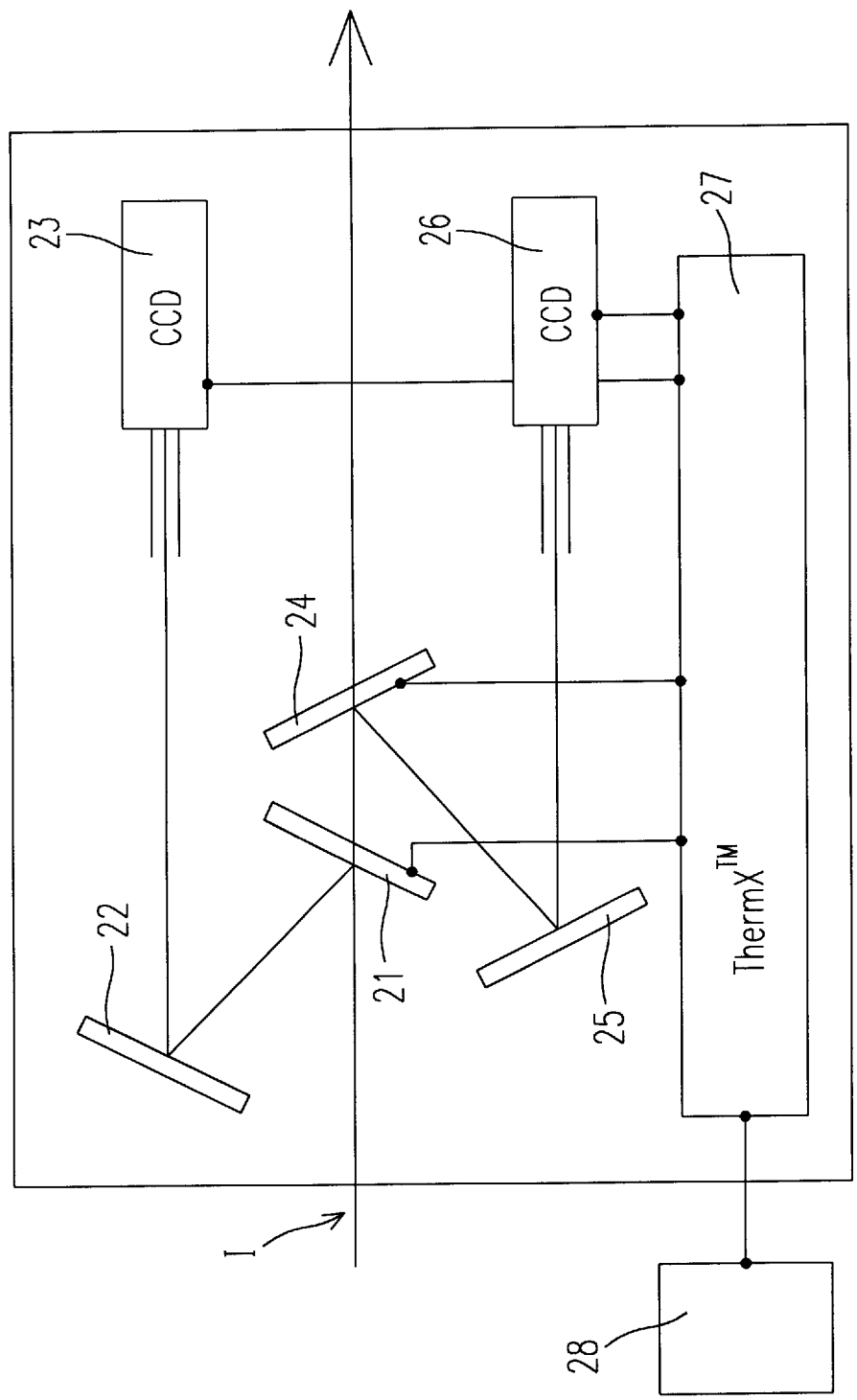
FIG. 2 is a schematic diagram showing a hardware structure of the known WaveAlyzer.

The first rotating mechanism 43 can be a step motor or a ThermX™ electronic driving device 27 (shown in FIG. 2) for rotating the phase shifter 41.

The phase shifter 41 is a shear plate for generating interference patterns by directing the light beam I to the phase shifter 41 at an incident angle θ and interfering thereon reflected beams R1, R2 from front and back surfaces of the phase shifter 41. The light beam I can be a continuous laser beam or a pulse laser beam.

The pattern recording device 44 further includes a CCD 442 connected to the second rotating mechanism 42 and used as a camera to receive the interference patterns, and a reflective mirror 441 connected to the second rotating mechanism 42 for reflecting the interference patterns.

The phase reconstruction device 45 can be a computer to run a phase reconstructing program and control the motions of the first rotating mechanism 43 and the second rotating mechanism 42.

Figure 5:
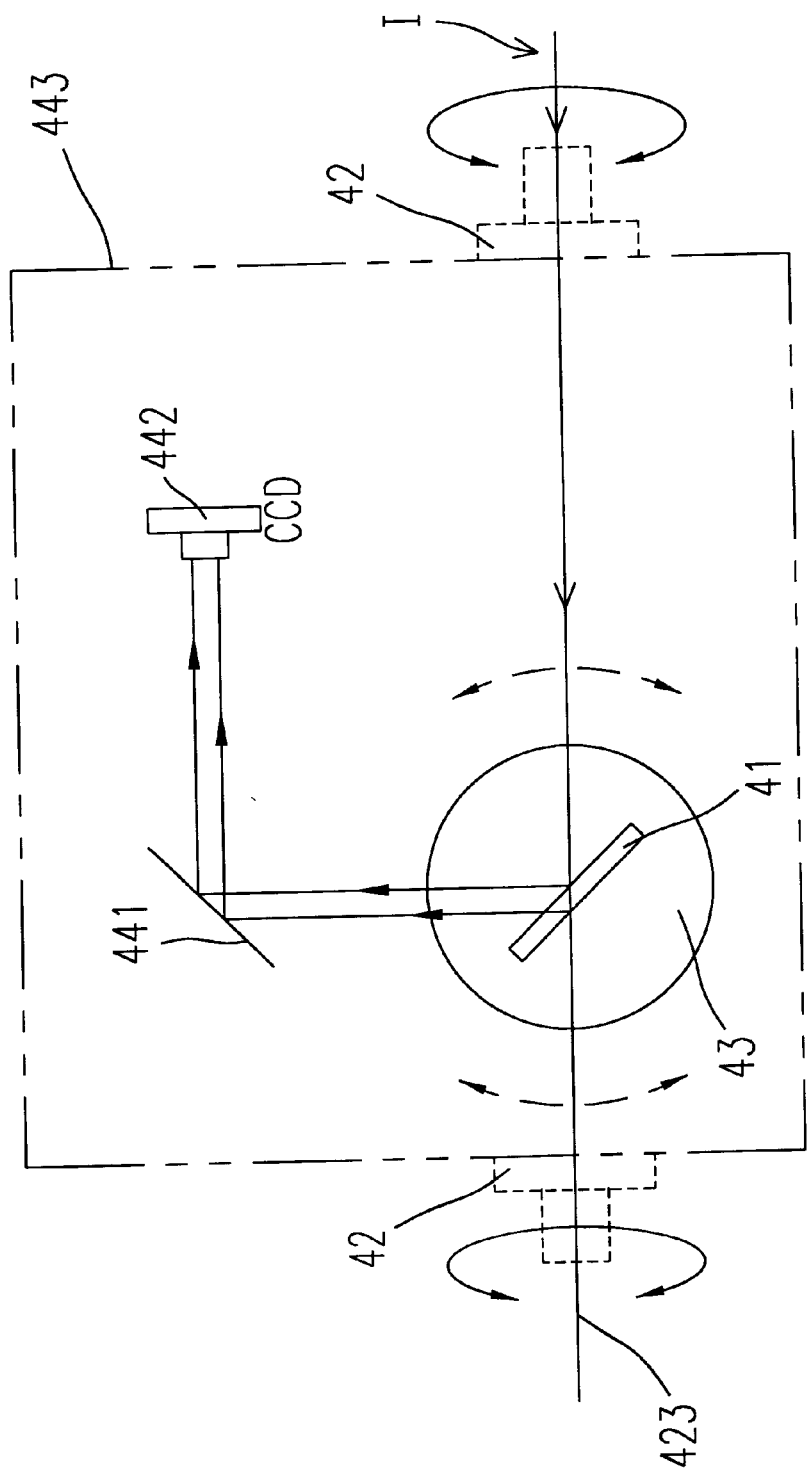
FIG. 5 is a schematic diagram showing a preferred embodiment of the first type assembly including a phase shifter, a second rotating mechanism, a first rotating mechanism, a reflective mirror and a CCD, all of which are combined to form a light beam transmitting path, according to the present invention.

Please refer to FIG. 5 illustrating a preferred embodiment of the first type assembly to form a light beam transmitting path according to the present invention. The phase shifter 41, the reflective mirror 441, and the CCD 442 are fixed to the outer case 443 so as to ensure that their relative positions are unchangeable.

The phase shifter 41, the reflective mirror 441 and CCD 442 are used to receive an interference pattern from the first position (also called as first axis or X-axis). The phase shifter 41 is finely rotated five times by a ThermX™ electronic driving device or a step motor on the first rotating mechanism 43 for changing the incident angle θ of the incident light beam I with respect to the phase shifter 41 and a five-step phase shifting technique is applied to obtain first five sets of difference of the phase angle.

The outer case 443, together with the phase shifter 41, the reflective mirror 441, and the CCD 442 fixed thereto, is then rotated 90° by a step motor on the second rotating mechanism 42 with respect to the incident direction from the first position to the second position (Y-axis). The phase shifter 24 is also finely rotated five times by the first rotating mechanism 43 for changing the incident angle θ of the incident light beam I with respect to the phase shifter 41 and a five-step phase shifting technique is applied to obtain second five sets of difference of the phase angle.

A phase unwrapping operation is then performed according to two sets of the difference of the phase angle from the first position and the second position, using a function fitting method with an program installed inside the phase constructing device 45 so as to complete optical wavefront inspection.

Figure 6:
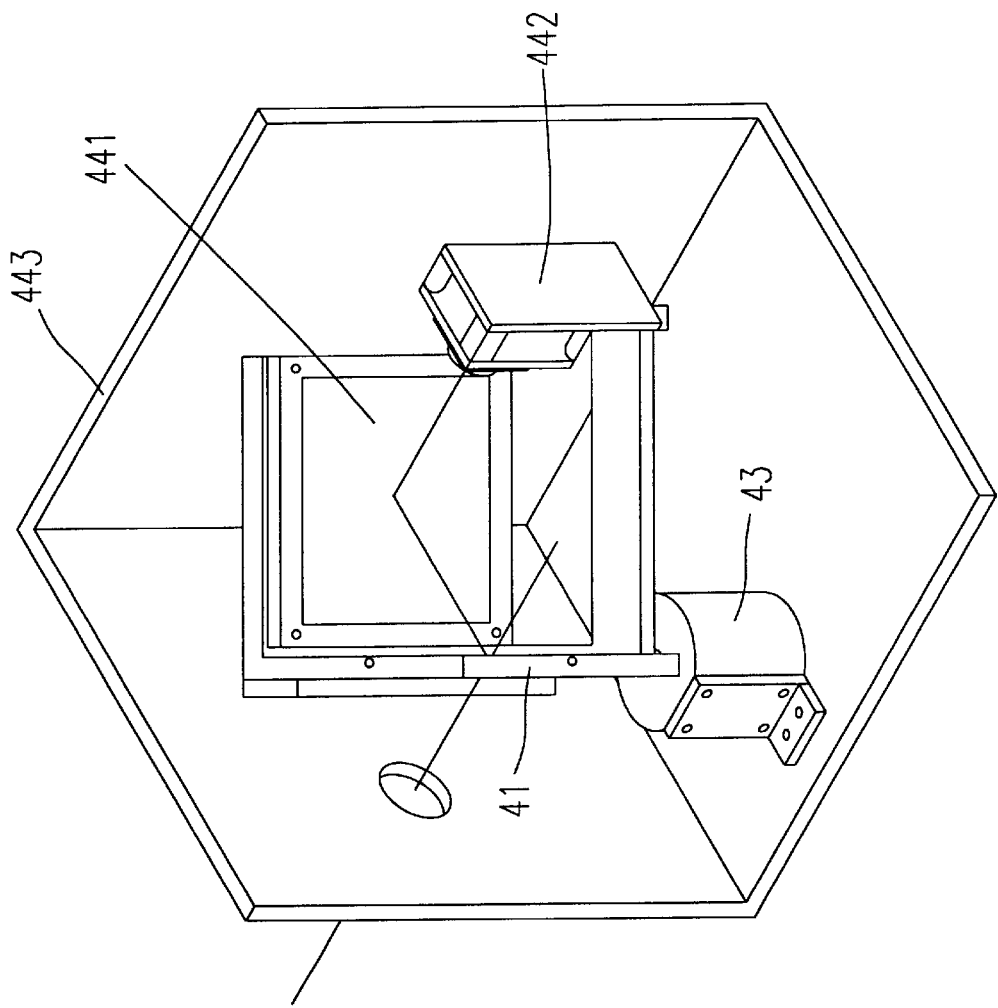
FIG. 6 is a perspective view showing the first type assembly of FIG. 5 according to the present invention.
Figure 7A:
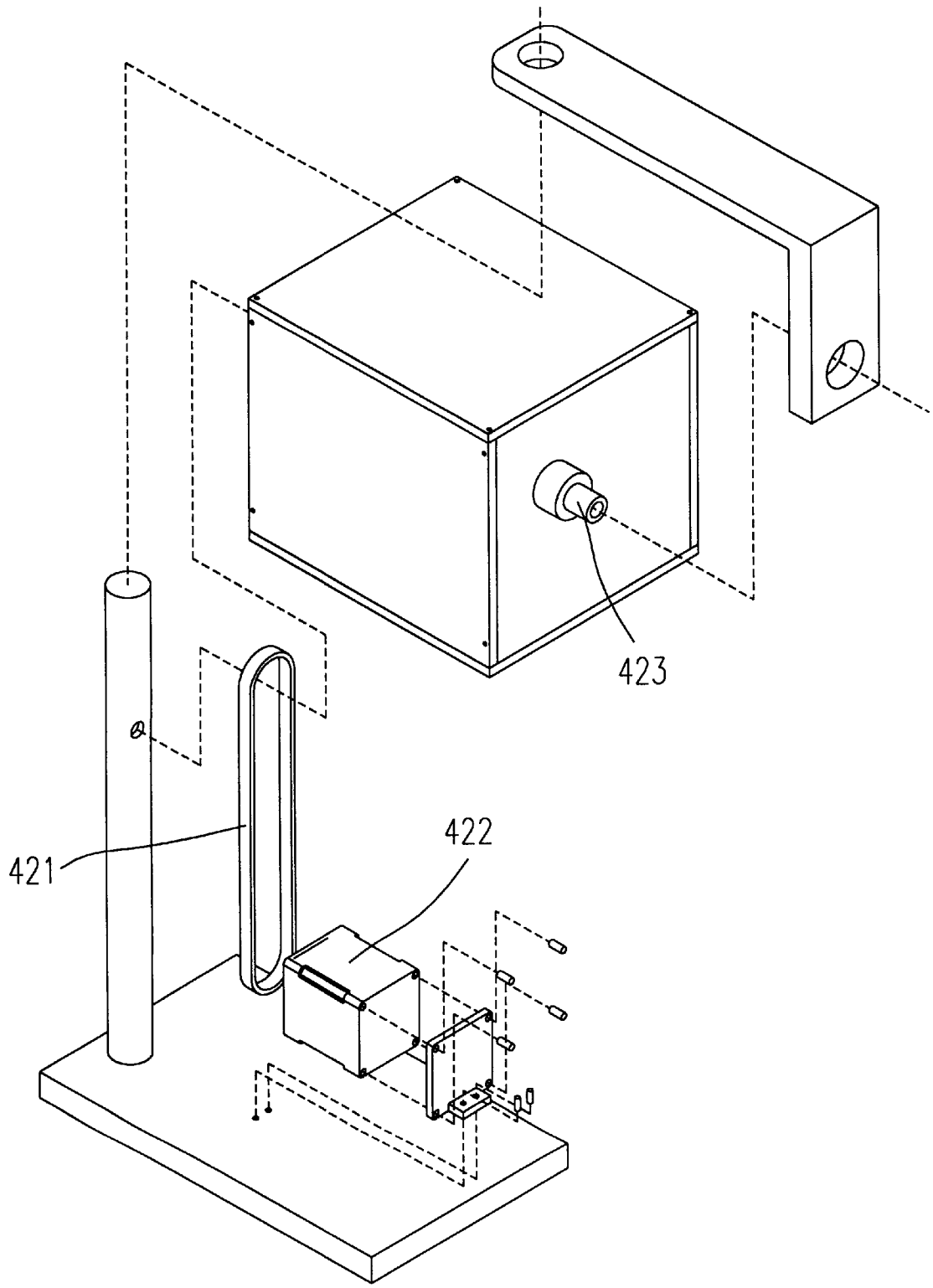
FIG. 7(a) is an exploded view showing a preferred embodiment of the first type assembly of FIG. 5 according to the present invention.
Figure 7B:
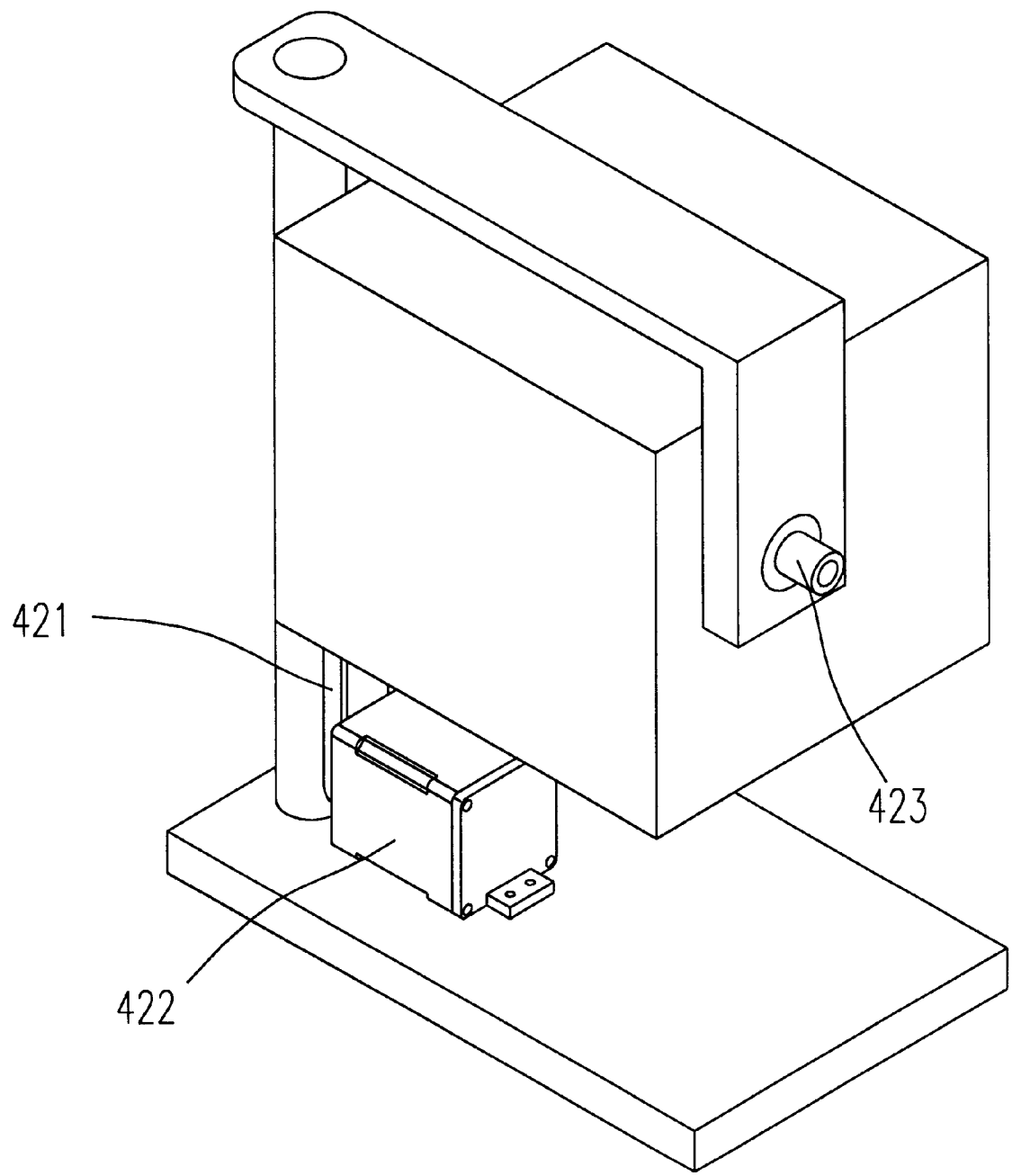
FIG. 7(b) is an elevation of the first type assembly of FIG. 5 according to the present invention.

A perspective view and an exploded view of the first type assembly according to the present invention are shown in FIG. 6 and FIG. 7(a), respectively. FIG. 7(b) is a schematic assembled view showing a preferred embodiment of the first type assembly according to the present invention. An exploded view and a schematic assembled view of the delivering belt 421, the motor 422 and the rotary axle 423 are also illustrated in FIG. 7(a) and (b), respectively. The CCD 442 and the phase shift 41 are mounted on and driven by the first rotating mechanism 43 to be finely rotated to a plurality of positions. The first type assembly is used in the case of small rotation angle.

For the first type assembly, when the phase shifter 41 is driven by the first rotating mechanism 43 to be finely rotated to a plurality of positions, the reflective mirror 441 does not move together with the phase shifter 41. Thus, if the rotation angle a of the first rotating mechanism 43 is too large which results in a rotation angle 2α after reflected by the reflective mirror 441, the CCD 442 can not receive the interference patterns from the reflective mirror 441. The present invention provides a second type assembly to solve the above-mentioned problem.

Figure 8:
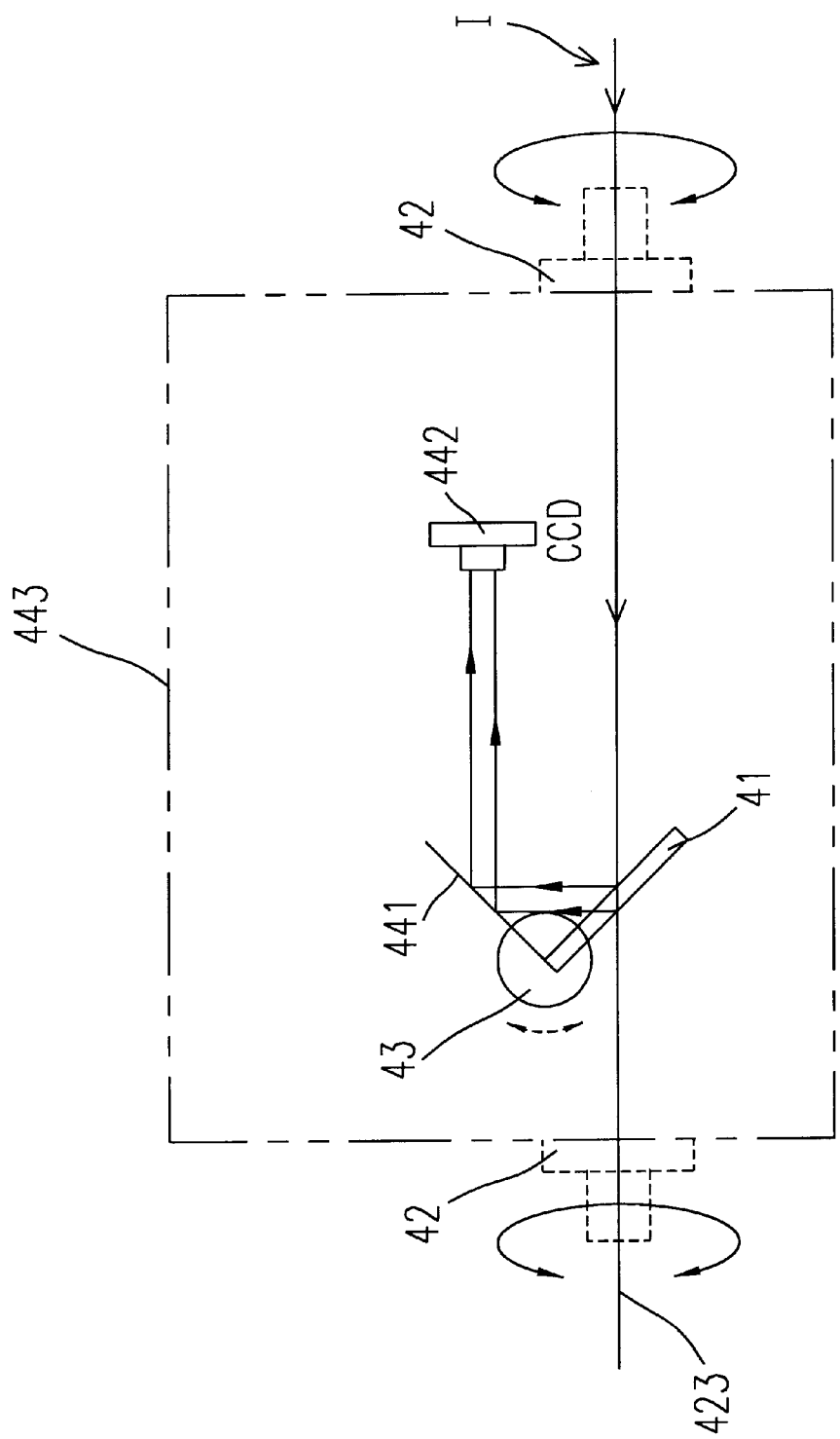
FIG. 8 is a schematic diagram showing a preferred embodiment of the second type assembly including a phase shifter, a second rotating mechanism, a first rotating mechanism, a reflective mirror and a CCD, all of which are combined to form a light beam transmitting path, according to the present invention.

FIG. 8 shows a preferred embodiment of the second type assembly for forming a light beam transmitting path according to the present invention, wherein the phase shifter 41 and the reflective mirror 441 are mounted on and driven by the first rotating mechanism 43 to be finely rotated to a plurality of positions so as to direct the interference patterns to the CCD 442. Other operation procedures for the second type assembly are the same as those for the first type assembly of FIG. 5, and will not be described repeatedly.

Figure 9:
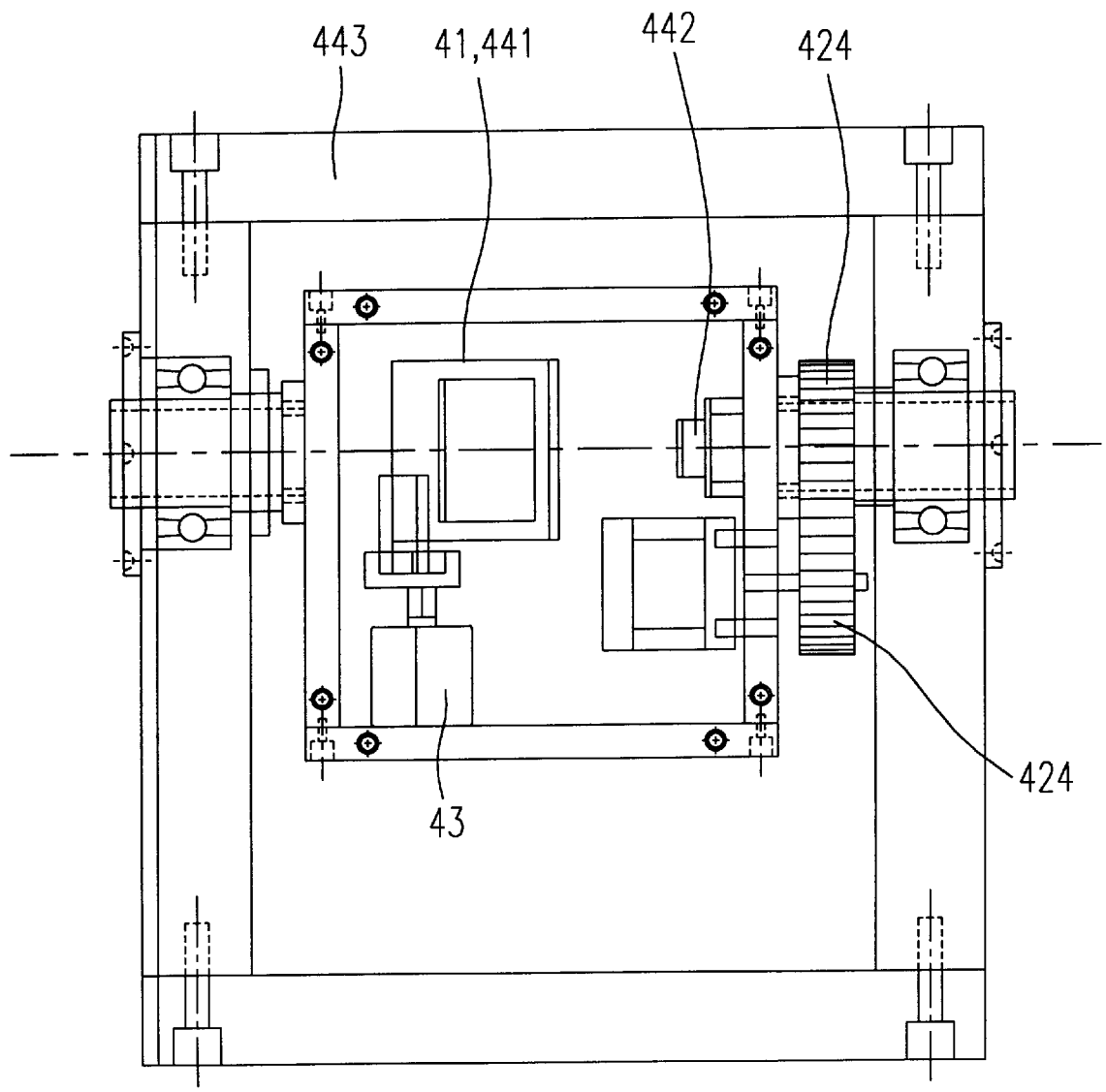
FIG. 9 is a sectional view of the second type assembly of FIG. 8 according to the present invention.
Figure 10A:
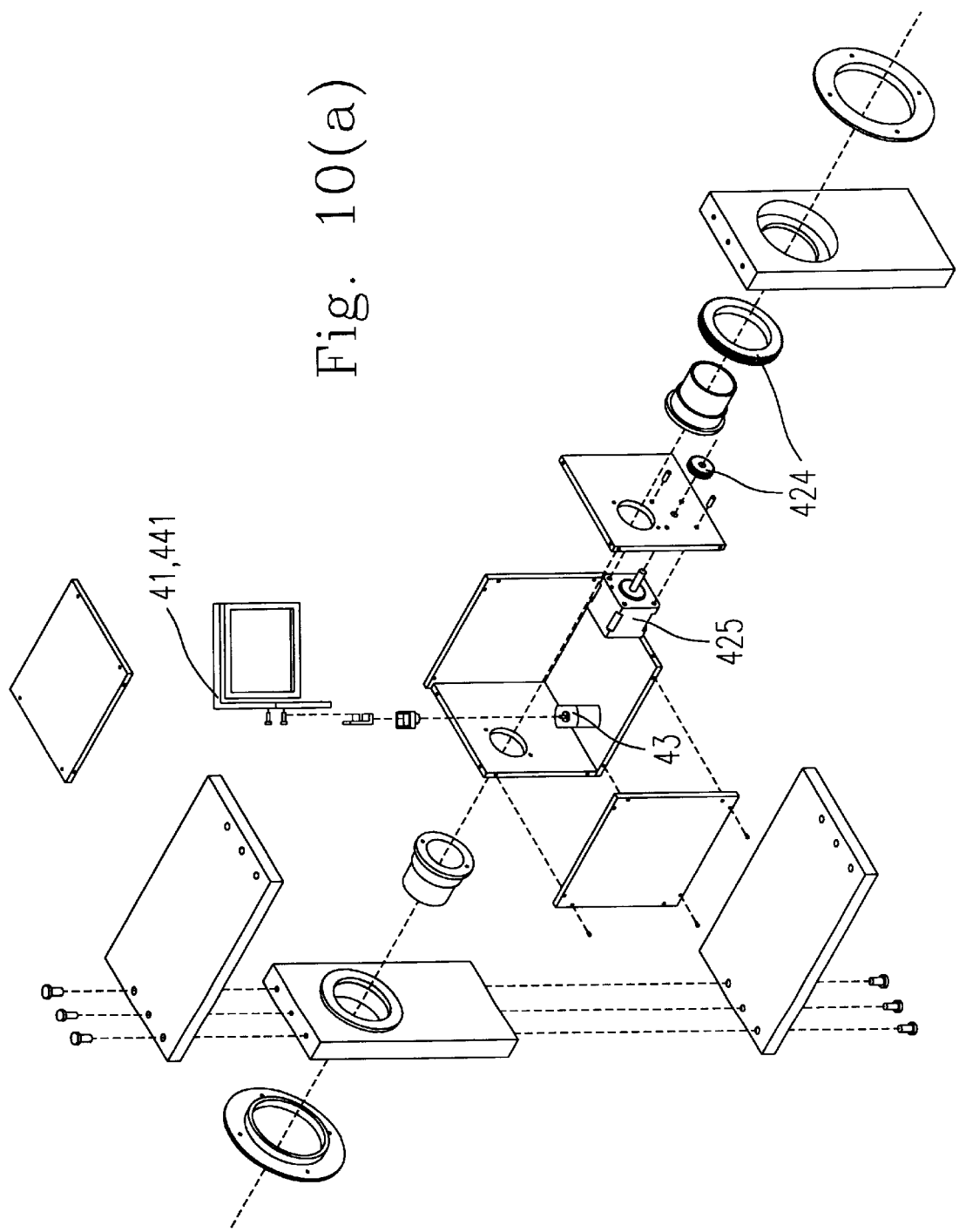
FIG. 10(a) is an exploded view showing a preferred embodiment of the second type assembly of FIG. 8 according to the present invention.
Figure 10B:
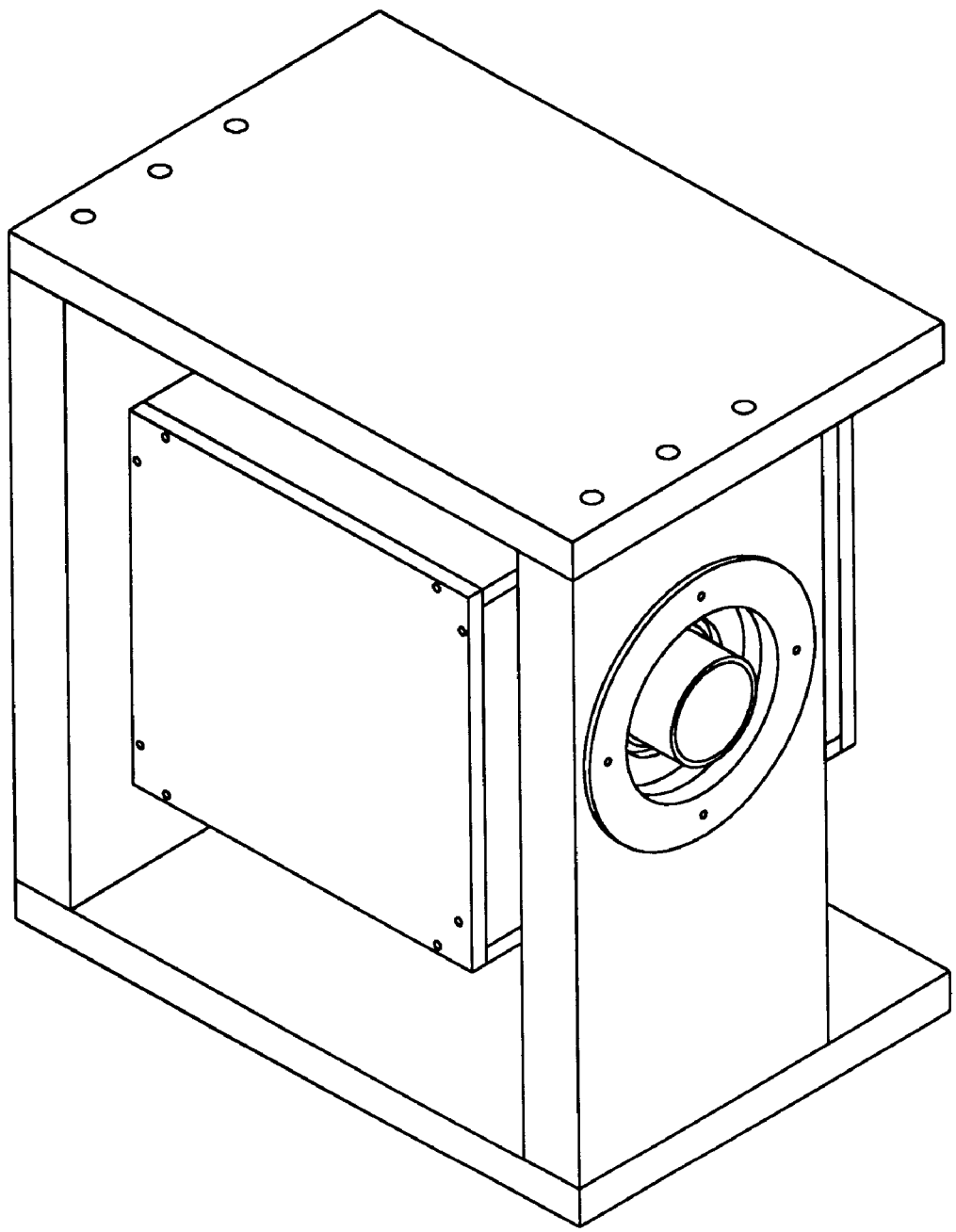
FIG. 10(b) is an elevation of the second type assembly of FIG. 8 according to the present invention.

A perspective view and an exploded view of the second type assembly according to the present invention are shown in FIG. 9 and FIG. 10(a), respectively. FIG. 10(b) is a schematic assembled view showing a preferred embodiment of the second type assembly according to the present invention. An exploded view and a schematic assembled view of the delivering gear assembly 424 and the motor 425 are also illustrated in FIG. 10(a) and (b), respectively. The reflective mirror 441 and the phase shift 41 are mounted on and driven by the first rotating mechanism 43 to be finely rotated to a plurality of positions. The second type assembly can be used in the case of large rotation angle.

The present invention also provides a method of measuring a wavefront of a light beam having an incident direction. The light beam is first caused to be incident with respect to the incident direction at a first incident angle to be reflected with two interfering reflected beams at a first position. The light beam is then respectively directed to be incident with respect to the incident direction at a first plurality of finely adjusted incident angles to be respectively reflected with a first plurality of pairs of two interfering reflected beams at a first plurality of finely adjusted positions around the first position in order to respectively obtain a first set of interference patterns having respectively a plurality of light intensities. The plurality of light intensities are recorded and measured. The light beam is further directed to be incident with respect to the incident direction at a second incident angle to be reflected with two interfering reflected beams at a second position. The light beam is then respectively caused to be incident with respect to the incident direction at a second plurality of finely adjusted incident angles to be respectively reflected with a second plurality of pairs of two interfering reflected beams at a second plurality of finely adjusted positions around the second position in order to respectively obtain a second set of interference patterns having respectively a plurality of light intensities. The light intensities are utilized to determine the wavefront of the light beam.

Figure 1:
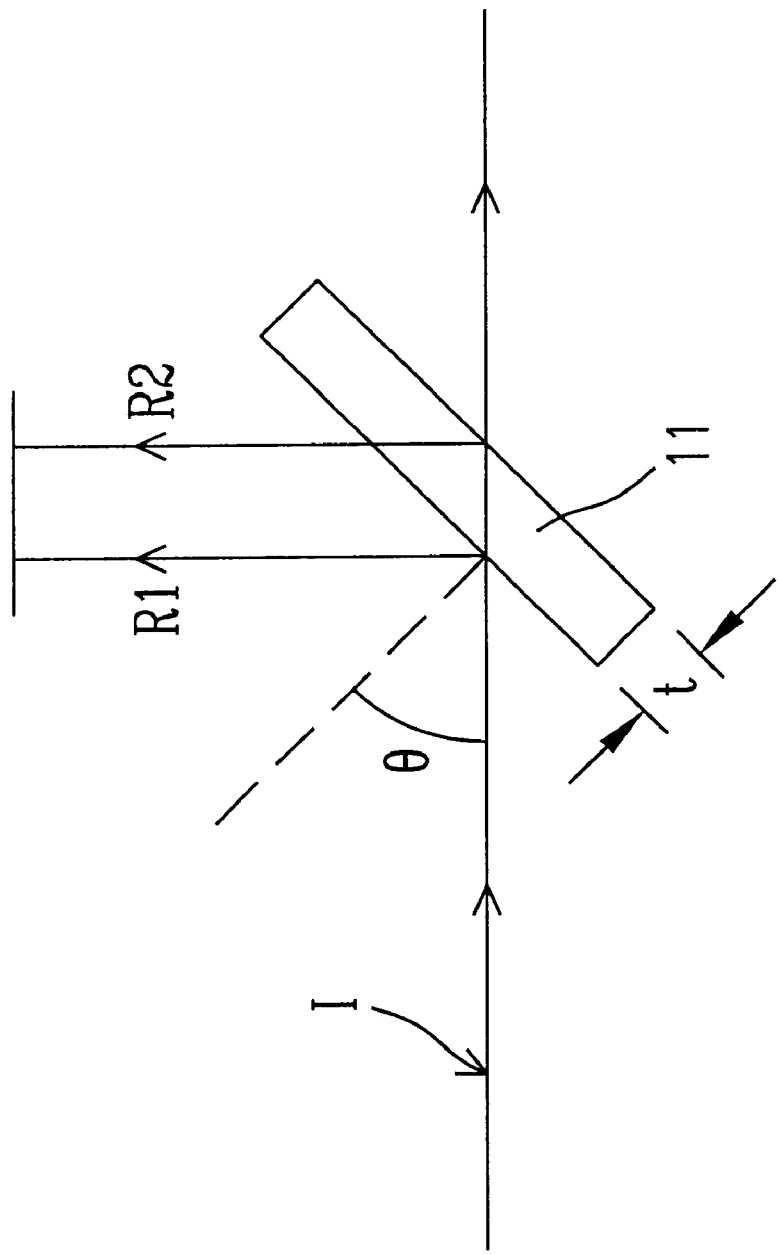
FIG. 1 is a schematic diagram showing a phase-shearing interferometry technique.

The step of causing the light beam to be incident with respect to the incident direction at a first incident angle to be reflected with two interfering reflected beams at a first position is performed by a phase shifter 41. The phase shifter 41 is a shear plate with a thickness t as shown in FIG. 1.

The method further includes a step of directing the reflected beams to a certain direction. The first position (the first axis, X-axis) and the second position (the second axis, Y-axis) have a 90° angular difference. The step of utilizing the light intensities to determine the wavefront of the light beam includes executing a phase unwrapping operation according to the light intensities. The phase unwrapping operation is performed by a non-iterative, path-independent unwrapping methodology.

Figure 3:
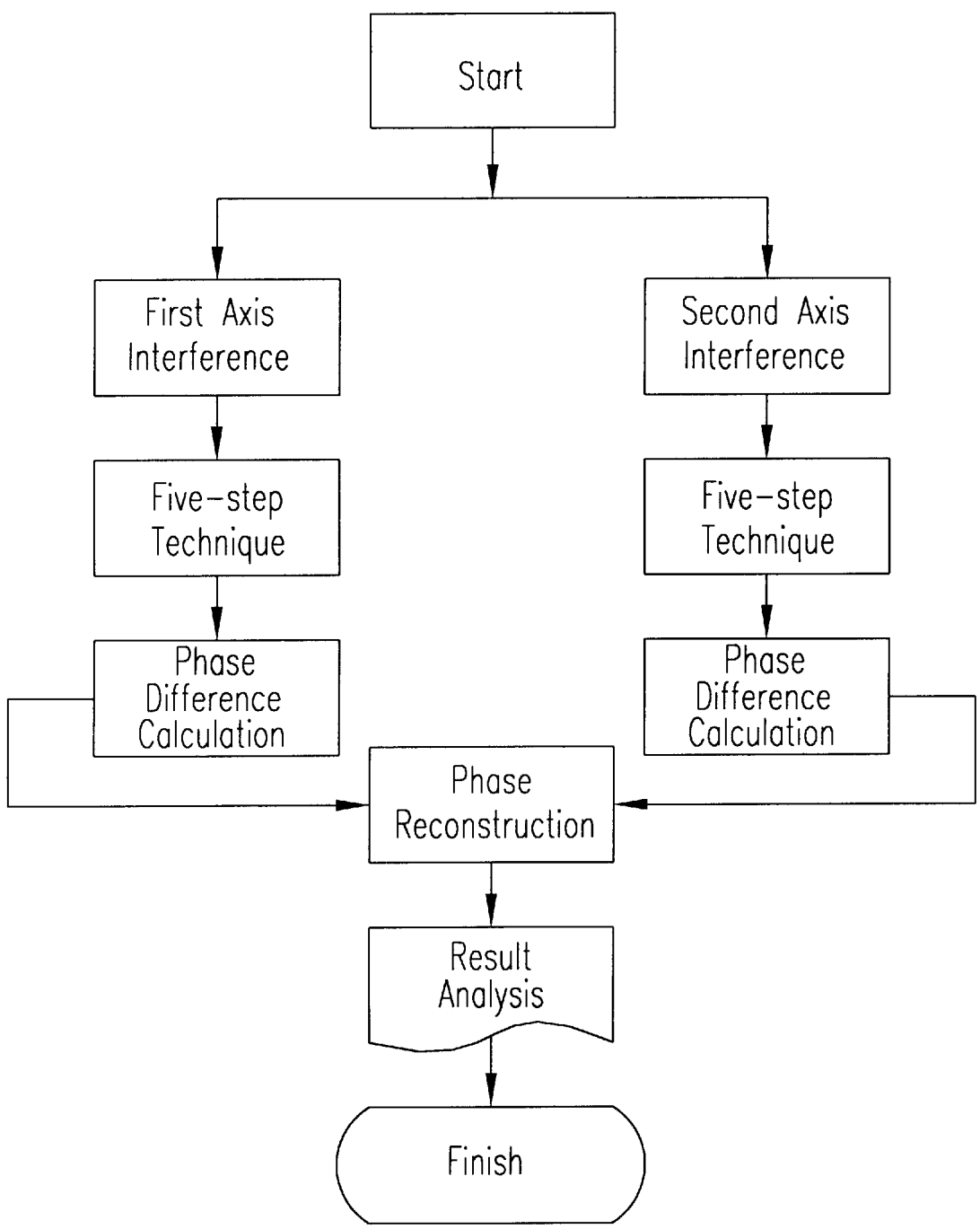
FIG. 3 is a flowchart of an optical wavefront measurement based on phase-shearing interferometry technique.

FIG. 3 is the flow chart of the method for an optical wavefront measurement by utilizing a phase-shearing interferometry technique. The present invention provides a non-iterative, path-independent unwrapping methodology in developing a phase reconstruction program to be executed by the phase reconstructing device 45 through a computer so as to effectively deal with more complicated wavefront of a light beam. The operational principle used in the present invention is to specify the relationship between each point on the wavefront and its adjacent points by Poisson equation, and then select discrete Fourier transform, fast Fourier transform, or discrete cosine transform in accordance with the spirit of least square method to reconstruct the wavefront of a light beam. The operation method according to the present invention can properly solve the problem of random noise occurred in the general measurement because in the prior method the noise will be accumulated in the two-axis phase difference function integration process resulting in lots of noise and errors occurred in the whole reconstruction results. On the other hand, discrete Fourier transform, fast Fourier transform, or discrete cosine transform is one kind of a non-iterative, path-independent unwrapping methodology and has same advantages in operational speed and desired result.

Figure 11A:
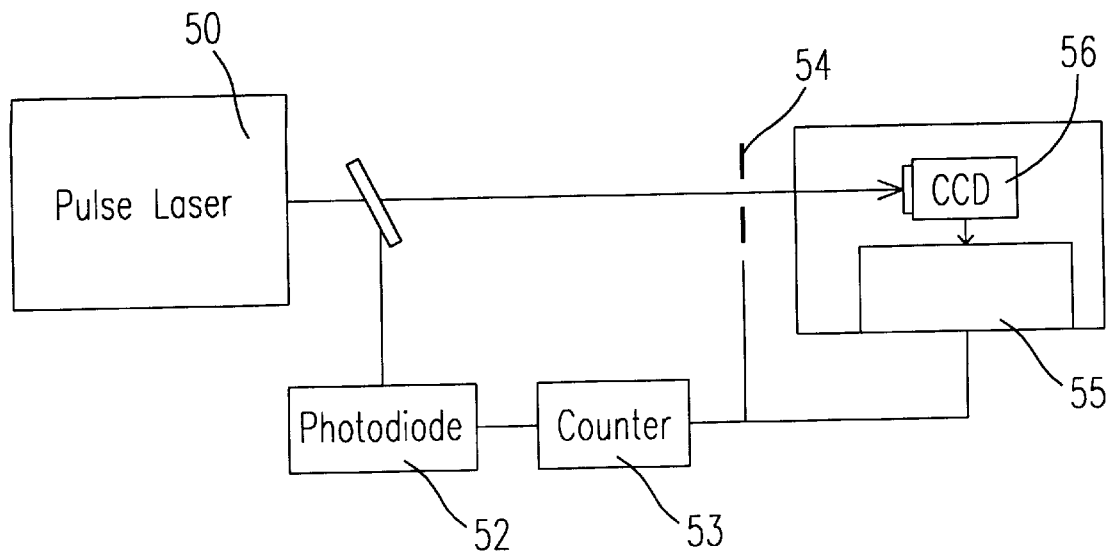
FIG. 11(a) and (b) are schematic diagrams showing preferred embodiments applied for pulse laser wavefront measurement, respectively, according to the present invention.
Figure 11B:
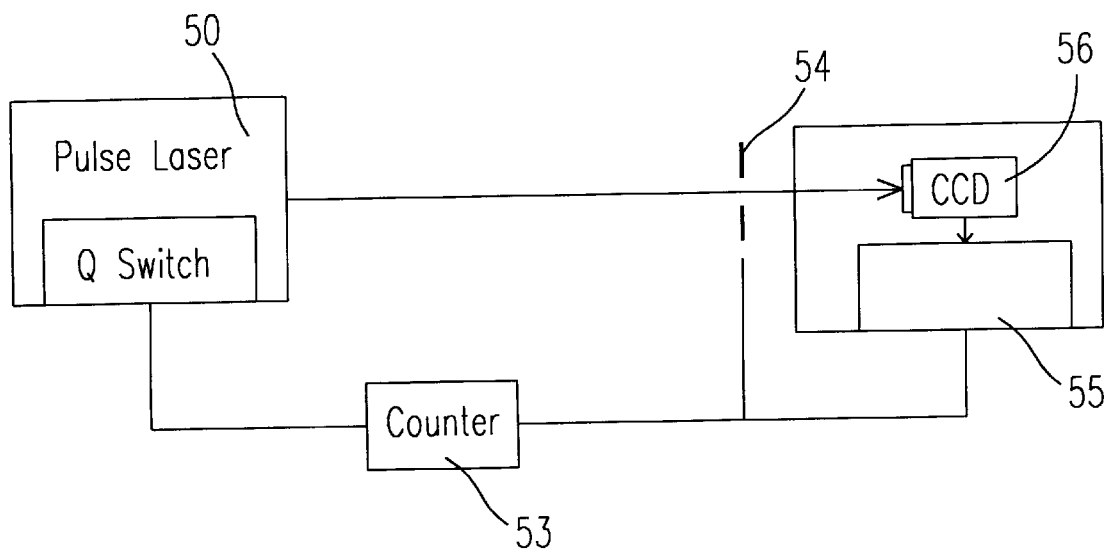

The present invention can be applied to the wavefront measurement of a pulse laser beam. Assuming that the output characteristic of the pulse laser 50 is unchanged, as a phase shifter is controlled and rotated to a specific angle, a pulse voltage at a frequency same as that of the modulator inside the pulse laser 50 can be obtained by directing a part of the incident light beam into the photodiode 52 through the spectroscope 51 for triggering the counter 53 to generate a control signal for operating the shutter 54 and an external triggering signal for pattern receiving card 55, as shown in FIG. 11(a). Please refer to FIG. 11(b) which illustrates an alternative method to measure a wavefront of a pulse laser beam. The Q switch signal of the pulse laser beam 50 is applied directly to trigger the counter 53 to generate a control signal for operating the shutter 54 and an external triggering signal for pattern receiving card 55. The shutter 54 can be a mechanical shutter, an acousto-optical modulator, or an electro-optical modulator, depending on the amplitude of the frequency of the signal to be measured. The pattern receiving card 55 is designed as a type of software trigger to meet the actual requirement and receives shearing interference patterns through the CCD 56. Therefore, the present invention can be applied not only to the high-tech industry requiring high output and high quality, such as semiconductor manufacturing industry, film coating industry, and disk drive industry, but also to research/development and education of optoelectric system.

Thus, an optical wavefront analyzer having fewer components in comparison with commercially available apparatus is developed. The size of the system according to the present invention is about one-tenth of other system performing similar function. The advantage in size makes the system according to the present invention be more easily connected to other optical experimental equipment and also greatly widens the application of optical wavefront measurement. In addition, the present invention overcomes the problems of two-axial focusing and phase inconsistency by employing phase-shearing and phase-shifting techniques to improve the method of optical wavefront mesurement.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical wavefront analyzer for measuring a wavefront of a light beam having an incident direction comprising:
    a single phase shifter for generating interference patterns as said light beam is made incident on said single phase shifter at an incident angle;
    a driving device for positioning said single phase shifter to a plurality of positions with respect to which said light beam is made incident on said single phase shifter at a plurality of said incident angles respectively in order to obtain a first set of interference patterns, and for rotating said single phase shifter with respect to said incident direction from a first position to a second position so as to respectively obtain said first set of interference patterns and a second set of interference patterns;
    a pattern receiving device for recording light intensities of said first set of interference patterns and said second set of interference patterns respectively; and
    a phase reconstructing device electrically connected to said pattern receiving device for executing a phase unwrapping operation according to said light intensities.

2. The analyzer according to claim 1 wherein said driving device comprises:
    a first rotating mechanism for positioning thereon and rotating said phase shifter to a plurality of positions with respect to which said light beam is made incident on said phase shifter at a plurality of said incident angles respectively in order to obtain said first set of interference patterns, and for aligning said phase shifter with said pattern receiving device so as to allow said interference patterns to enter into said pattern receiving device; and
    a second rotating mechanism for positioning therein and rotating said phase shifter and said pattern receiving device with respect to said incident direction from said first position to said second position so as to respectively obtain said first set of interference patterns and said second set of interference patterns.

3. The analyzer according to claim 2 wherein said second rotating mechanism comprises an outer case positioning therein said phase shifter and said pattern receiving device.

4. The analyzer according to claim 3 wherein said outer case is a cylinder.

5. The analyzer according to claim 3 wherein said outer case includes two coaxially rotating cubic boxes.

6. The analyzer according to claim 2 wherein said second rotating mechanism has a step motor for rotating said outer case.

7. The analyzer according to claim 2 wherein said first rotating mechanism has a step motor for rotating said phase shifter.

8. The analyzer according to claim 2 wherein said first rotating mechanism has a microactuator for rotating said phase shifter.

9. The analyzer according to claim 1 wherein said phase shifter is a shear plate.

10. The analyzer according to claim 1 wherein said phase reconstruction device is a computer.

11. The analyzer according to claim 1 wherein said light beam is a laser beam.

12. The analyzer according to claim 1 wherein said pattern recording device further comprises:
    a charge coupled device connected to said second rotating mechanism so as to receive said interference patterns; and
    a reflective mirror connected to said second rotating mechanism for reflecting said interference patterns.

13. The analyzer according to claim 12 wherein said charge coupled device is connected to said second rotating mechanism and thereby aligned with said reflective mirror so as to receive said interference patterns therefrom.

14. The analyzer according to claim 12 wherein said reflective mirror is mounted on said first rotating mechanism and thereby aligned with said phase shifter by a 90° angle so as to direct said interference patterns to enter into said charge coupled device.

15. A method of measuring a wavefront of a light beam having an incident direction comprising:
    (a) causing said light beam to be incident with respect to said incident direction on a single phase shifter at a first incident angle to be reflected with two interfering reflected beams at a first position;
    (b) respectively causing said light beam to be incident with respect to said incident direction at a first plurality of finely adjusted incident angles to be respectively reflected with a first plurality of pairs of two interfering reflected beams at a first plurality of finely adjusted positions around said first position in order to respectively obtain a first set of interference patterns having respectively a plurality of light intensities;
    (c) recording and measuring said plurality of light intensities;
    (d) causing said light beam to be incident with respect to said incident direction on said single phase shifter at a second incident angle to be reflected with two interfering reflected beams at a second position having a 90° angular difference with said first position;
    (e) respectively causing said light beam to be incident with respect to said incident direction at a second plurality of finely adjusted incident angles to be respectively reflected with a second plurality of pairs of two interfering reflected beams at a second plurality of finely adjusted positions around said second position in order to respectively obtain a second set of interference patterns having respectively a plurality of light intensities; and
    (f) utilizing said light intensities data to determine said wavefront of said light beam.

16. The method according to claim 15 wherein said light beam is a laser beam.

17. The method according to claim 15 wherein (a) is performed by a phase shifter.

18. The method according to claim 17 wherein said phase shifter is a shear plate.

19. The method according to claim 15 further comprising a step of directing said reflected beams to an opposite direction of said incident direction.

20. The method according to claim 15 wherein (f) comprises executing a phase unwrapping operation according to said light intensities.

21. The method according to claim 20 wherein said phase unwrapping operation is performed by a non-iterative, path-independent unwrapping methodology.

22. The method according to claim 21 wherein said non-iterative, path-independent unwrapping methodology comprises a discrete Fourier transform.

23. The method according to claim 21 wherein said non-iterative, path-independent unwrapping methodology comprises a fast Fourier transform.

24. The method according to claim 21 wherein said non-iterative, path-independent unwrapping methodology comprises a discrete cosine transform.

* * * * *